June 10, 1924.

I. HENNINGS

FISHING LURE

Filed Aug. 26, 1920

1,497,019

Ivar Hennings
INVENTOR.

BY George J. Itsch

ATTORNEY.

Patented June 10, 1924.

1,497,019

UNITED STATES PATENT OFFICE.

IVAR HENNINGS, OF SOUTH BEND, INDIANA.

FISHING LURE.

Application filed August 26, 1920. Serial No. 406,207.

*To all whom it may concern:*

Be it known that I, IVAR HENNINGS, a citizen of the United States, residing at South Bend, in the county of St. Joseph and State of Indiana, have invented certain new and useful Improvements in Fishing Lures, of which the following is a specification.

My invention relates to fishing lures, and more particularly to artificial casting flies, and consists primarily in the provision of a buoyant body serving as a float, and which is equipped with a hook of a particular form which is fashioned to provide an eye for attachment of a line, and with a part which will permit the hook to be securely anchored to the body in a manner to prevent relative endwise shifting of the body and hook, as well as to prevent relative rotative movement between said parts.

The object of the invention is to simplify the manufacture of lures of the type disclosed, by fashioning out of a single length of wire a hook provided with a line attaching eye, and with a laterally projecting prong for anchoring same to a float, and thereby obviate the necessity, as is the present practice, of brazing or welding a prong to the hook shank for like purposes, whereby a saving of time and cost of manufacture is effected, as well as the additional advantages resulting from the use of a less number of parts. A further object is to provide a lure of the type herein disclosed which will be constructed in a manner to effectively withstand rough usage, as when subjected to attack by and by the struggles of game fish hooked thereon, as well as the stresses to which the same will be subjected in the act of removing the hook from the mouth of a fish.

The invention in the preferred form of details will be described in the following specification, reference being had particularly to the accompanying drawings, in which:—

Figure 3:
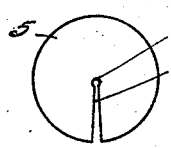
Figure 3 is an end view of the lure body.
Figure 4:
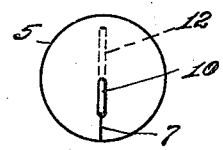
Figure 4 is a similar view with the hook applied.

Referring now more particularly to Figs. 1 to 4 inclusive of the drawing, the body 5 of the lure, which may be variously modified as to form, preferably consists of a buoyant material of a yielding nature to a degree, such as cork, or a synthetic material having like properties. The body 5 is provided with an axial bore 6, and with a slit 7 intersecting said bore and co-extensive with the length of the body. In Fig. 3 the slit is shown spread apart to permit the application of the hook to the position shown in Fig. 2, the yielding or resilient nature of the cork permitting such to be accomplished without fracturing or splitting the body beyond the slit.

The hook 8 is adapted to have its shank portion 9 seated within the bore 6 of the body, and has its shank portion bent upon itself to form a loop or eye 10 to facilitate attachment of a fish line thereto, the end of the shank being bent laterally and inwardly remote from the loop to provide a prong 12, which is adapted to pierce the body 5 beyond the slit therein, and thus not only prevent relative endwise shifting, but also relative rotative movement between the body and hook. After placement of the hook in proper position with relation to the body, and preferably also the placement of the ends of feathers 13 and hair 14 within the slit, with the object of simulating or giving the lure the appearance of a bug and other creatures, as is well understood in the art, windings of thread or fine wire 15 are applied about the body at intervals to tightly draw together the body portions separated by the slit, thus tending to effect a clamping action upon the shank of the hook and effectively hold the same in place.

Figure 1:
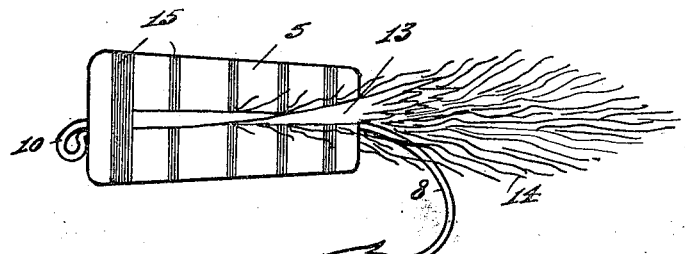
Figure 1 is a side elevation of a lure embodying the improvement.
Figure 2:
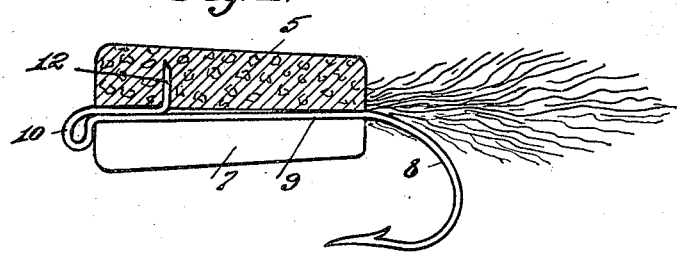
Figure 2 is a vertical sectional view of the lure as shown in Fig. 1.
Figure 5:
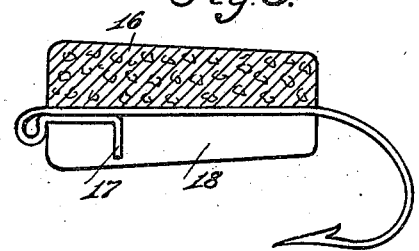
Figure 5 is a vertical sectional view of the lure showing a modified form thereof.

In the modification shown in Fig. 5, the body 16 is of like material and is provided with a like slit as in the type above described, but the hook is fashioned somewhat different, in that the prong 17 extends on the side of the shank toward the hooked end thereof, and which, when positioned within the slit 18, and the slit portions of the body are drawn together by thread or wire wound thereabout, as in the manner shown in Fig. 1, becomes embedded in the yielding body material, and serves to hold the body and hook against relative movement in any direction.

It will be apparent from the foregoing, that the formation of a hook with a line attaching eye and a lateral anchoring prong out of a single length of wire, for the purposes herein set forth, materially simplifies the manufacture of lures of the type disclosed, and reduces the cost of manufacture thereof by eliminating the necessity, as is the present practice, of brazing or welding the prong to the hook shank, which is a relatively much more costly method of manufacture.

While the foregoing is the preferred form of my invention, it is to be understood that I do not limit myself to the precise structure shown and described, as it is obvious that various modifications thereof may be made without departing from the spirit of the invention as defined by the claims.

What is claimed is:—

1. The combination with a fishing lure comprising a body member, a fishing hook, the shank of said fishing hook disposed in a slot of the body member, said shank terminating in an eye disposed outside of one end of the body, of means for preventing longitudinal movement of said shank in the slot, said means comprising an integral member carried by the eye and extending inwardly substantially parallel to the shank in the same plane as the hook and shank and terminating in an angularly disposed portion imbedded in the body and in the same plane as the shank.

2. A fish lure comprising a body having a slit therein, a fish hook having a shank, said shank being disposed in the slit of said body, an eye carried by the end of said shank, means for preventing displacement or rotation of the shank in the body, said means and eye being integrally formed from a single piece of material integral with the shank and formed by bending the material on itself into parallel relation to the shank and in the same plane as the hook for providing an inwardly extending portion extending into the body, and a laterally extending portion carried by said inwardly extending portion and in the same plane as the shank.

3. The combination with a fish hook shank disposed within a slot of a body, said fish hook having its end bent to form an eye, an inwardly extending portion carried by said eye and extending into the body in the same plane as the hook and shank, the inner end of said inwardly extending portion terminating in a laterally extending portion imbedded in the body and in the same plane as the shank.

In testimony whereof I affix my signature.

IVAR HENNINGS.